Figure 1:
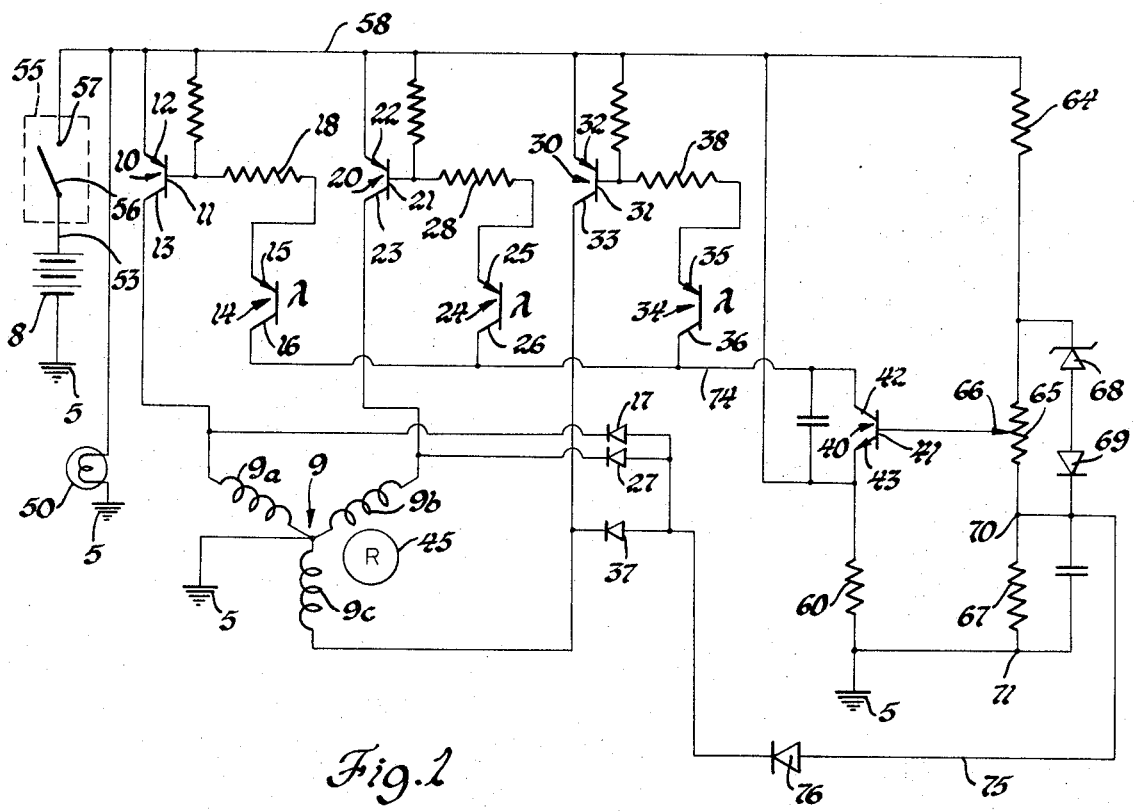

United States Patent
Elliott et al.

[15] 3,667,019
[45] May 30, 1972

[54] CONTROL CIRCUIT FOR ADJUSTING AND REGULATING THE SPEED OF A BRUSHLESS DIRECT CURRENT MOTOR RESPONSIVE TO VOLTAGES INDUCED IN THE ARMATURE WINDINGS

[72] Inventors: James O. Elliott, Xenia; George W. Jackson, Dayton, both of Ohio

[73] Assignee: General Motors Corporation, Detroit, Mich.

[22] Filed: Oct. 12, 1970

[21] Appl. No.: 79,729

[52] U.S. Cl. ............................. 318/254, 318/327, 318/138, 318/331
[51] Int. Cl. ............................................. H02k 29/00
[58] Field of Search .................. 318/138, 254, 439, 326, 327, 318/596, 585, 331

[56] References Cited

UNITED STATES PATENTS

| | | |
|---|---|---|
| 3,440,506 | 4/1969 | Krestel et al. ............................ 318/138 |
| 3,412,303 | 11/1968 | Rakes ................................ 318/254 X |
| 3,517,289 | 6/1970 | Brunner et al. ......................... 318/138 |
| 3,386,019 | 5/1968 | Hill ........................................ 318/254 |
| 3,274,471 | 9/1966 | Moczala .............................. 318/138 |
| 3,250,971 | 5/1966 | Brunner et al. ......................... 318/138 |

*Primary Examiner*—G. R. Simmons
*Attorney*—Eugene W. Christen, Creighton R. Meland and Richard G. Stahr

[57] ABSTRACT

A control circuit for adjusting and regulating the speed of a brushless direct current motor having three "wye" connected armature coils, a permanent magnet field and a rotatable shaft. Each motor armature coil is connected in series with the collector-emitter electrodes of a respective switching transistor across a source of direct current supply potential, the base-emitter electrodes of each switching transistor being connected across the source of direct current supply potential through a respective photosensitive electrical switching device and the collector-emitter electrodes of a control transistor. A selectively variable magnitude of a direct current control potential is applied across the base-emitter electrodes of the control transistor and the photosensitive electrical switching devices are sequentially illuminated as the shaft rotates to sequentially establish the switching transistor base-emitter drive circuits. A direct current regulating potential generated in the motor armature coils as they are "cut" by the flux produced by the permanent magnet field is of a magnitude proportional to the speed of the motor and is applied in a reverse polarity relationship to the control potential for regulating the speed of the motor.

4 Claims, 2 Drawing Figures

Patented May 30, 1972 3,667,019

INVENTORS
James O. Elliott &
BY George W. Jackson

Richard G. Stahr
ATTORNEY

CONTROL CIRCUIT FOR ADJUSTING AND REGULATING THE SPEED OF A BRUSHLESS DIRECT CURRENT MOTOR RESPONSIVE TO VOLTAGES INDUCED IN THE ARMATURE WINDINGS

This invention is directed to a control circuit for adjusting and regulating the speed of a brushless direct current motor having three "wye" connected armature coils and, more specifically, to a circuit of this type which employs sequentially illuminated photosensitive switching devices to commutate the motor and which supplies a direct current regulating potential of a magnitude proportional to motor speed for regulating the speed of the motor.

Conventional direct current electrical motors having the well known commutator and brush arrangement when used with various electronic audio reproduction machines, such as tape players, are disadvantageous from the standpoint of producing spurious electrical noises in the audio reproducing machine. To eliminate this disadvantage, brushless direct current motors have been developed.

It is, therefore, an object of this invention to provide an improved control circuit for adjusting and regulating the speed of a brushless direct current motor.

It is another object of this invention to provide an improved control circuit for adjusting and regulating the speed of a brushless direct current motor wherein sequentially illuminated photosensitive electrical switching devices provide for the motor commutation at a speed proportional to the magnitude of a selected control potential and a direct current regulating potential of a magnitude proportional to motor speed is produced and applied to the control potential in an opposite polarity relationship for regulating the speed of the motor.

In accordance with this invention, a control circuit for adjusting and regulating the speed of a brushless direct current motor having three "wye" connected armature coils, a permanent magnet field and a rotatable shaft is provided wherein the armature coils are connected across a source of direct current supply potential through the current carrying electrodes of respective switching transistors which are sequentially triggered conductive and not conductive by respective sequentially illuminated and shaded photosensitive electrical switching devices, each of which is connected in the base drive circuit of the corresponding switching transistor and in series with the collector-emitter electrodes of a control transistor across the base-emitter electrodes of which is applied a selectively variable magnitude of control potential for adjusting motor speed and a direct current regulating potential of a magnitude proportional to motor speed is produced and applied to the control potential in an opposite polarity relationship for automatically regulating motor speed.

Figure 2:
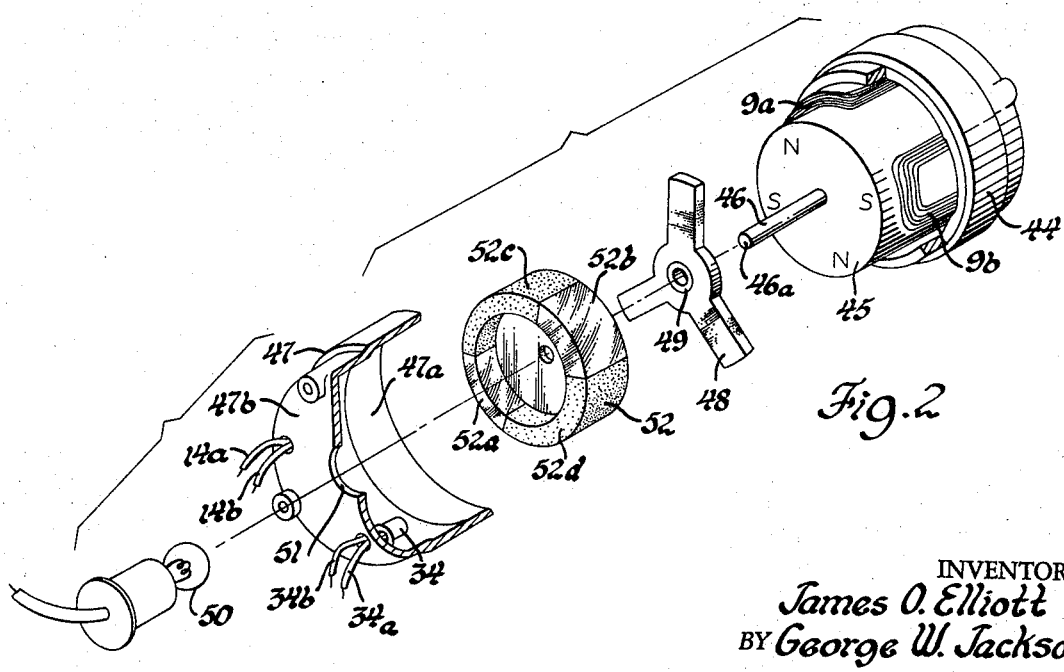

For a better understanding of the present invention, together with additional objects, advantages, and features thereof, reference is made to the following description and accompanying drawings in which:

FIG. 1 sets forth the novel control circuit of this invention in schematic form; and FIG. 2 is an exploded view, partially in cross-section, of a brushless direct current motor suitable for use with the control circuit of this invention.

In FIG. 1 of the drawings, the point of reference or ground potential has been represented by the accepted schematic symbol and referenced by the numeral 5.

Referring to FIG. 1, the control circuit of this invention for adjusting and regulating the speed of a brushless direct current motor having three "wye" connected armature coils, a permanent magnet field and a rotatable shaft is set forth in schematic form in combination with a source of direct current supply potential, may be a conventional storage battery 8; first, second and third switching transistors, type PNP transistors 10, 20 and 30, and a control transistor, type NPN transistor 40, and first, second and third photosensitive electrical switching devices which may be photo Darlington transistors 14, 24 and 34.

One example of a photosensitive electrical switching device suitable for use with the control circuit of this invention is the commercially available photo Darlington transistor. These photo Darlington transistors have been schematically represented in FIG. 1 and are referenced by the numerals 14, 24 and 34. Photo Darlington transistors of this type are not conductive through the emitter-collector electrodes while shaded and are conductive through the emitter-collector electrodes when illuminated, in a manner well known in the art.

One example of a brushless direct current motor suitable for use with a novel control circuit of this invention is shown in an exploded view, partially in cross-section of FIG. 2 and is referenced by the numeral 9 in FIG. 1 in which it is set forth in schematic form. The brushless direct current motor illustrated in FIG. 2 is of the rotating field type in which the armature coils are stationary, being fixed to or mounted upon the motor frame, and the permanent magnet field rotates as the rotor. It is to be specifically understood that the control circuit of this invention is equally adaptable for use with brushless direct current motors of the type having a stationary permanent magnet field and rotating armature coils. The motor 9 may have three armature coils 9a, 9b and 9c connected in a "wye" configuration with the junction of the three coils being connected to point of reference or ground potential 5. Armature coils 9a, 9b and 9c are spaced 120° apart and are mounted about the periphery of a frame member 44 in such a manner that a rotating permanent magnet field magnet 45, hereinafter referred to as rotor 45, is accommodated therebetween. In FIG. 2, only armature coils 9a and 9b are shown, armature coil 9c being masked from view by rotor 45. The end 46a of rotatable shaft 46 is supported in end bell 47 by a bearing support spider 48 having three legs, each of a length which is snugly accommodated by the internal bore 47a of end bell 47 and a centrally located sleeve type bearing 49 which rotatably accommodates end 46a of rotatable shaft 46. Photo transistors 14, 24 and 34 are spaced 120° apart and located about the end enclosing portion 47b of end bell 47, only photo Darlington transistor 34 being shown in FIG. 2. A conventional electric lamp 50 extends through an accommodating opening 51 through end enclosing portion 47b of end bell 47 and is energized by any manner well known in the art. To sequentially illuminate and shade photo Darlington transistors 14, 24 and 34 as rotatable shaft 46 is rotated by rotor 45, a shutter member 52, having alternate 90° clear sections 52a and 52b and 90° masked sections 52c and 52d, is rotatably attached to rotatable shaft 46 and is disposed between photo Darlington transistors 14, 24 and 34 and electric lamp 50. As rotor 45 rotates shaft 46 and shutter 52, photo Darlington transistors 14, 24 and 34 are sequentially illuminated through clear sections 52a or 52b and are shaded by masked sections 52c or 52d. Leads 34a and 34b and leads 14a and 14b provide for the connection of photo Darlington transistors 34 and 14 to external circuitry. Similar leads, not shown, are also provided for photo Darlington transistor 24.

The current carrying electrodes of each one of switching transistors 10, 20 and 30 are connected in series with a respective one of motor armature coils 9a, 9b and 9c across the source of direct current supply potential for establishing and interrupting and energizing circuit for each respective motor armature coil. The current carrying electrodes, emitter electrode 12 and collector electrode 13 of switching transistor 10 are connected in series with motor armature coil 9a across battery 8, the current carrying electrodes, emitter electrode 22 and collector electrode 23 of switching transistor 20 are connected in series with motor armature coil 9b across battery 8 and the current carrying electrodes, emitter electrode 32 and collector electrode 33 are connected in series with motor armature coil 9c across battery 8 through lead 53, which connects the positive polarity terminal of battery 8 to movable contact 56 of switch 55, movable contact 56 and stationary contact 57 of switch 55 when closed, and positive polarity lead 58 and through point of reference or ground potential 5 to which the negative polarity terminal of battery 8 is connected.

The control electrode and a selected one of the current carrying electrodes of each one of switching transistors 10, 20 and 30, a respective one of the photosensitive electrical switching devices 14, 24 and 34 and the current carrying electrodes of control transistor 40 are also connected across the source of direct current potential. The parallel combination of emitter electrode 12 and base electrode 11 of transistor 10 and the emitter electrode 15 and collector electrode 16 of photo Darlington transistor 14 in series, the emitter electrode 22 and base electrode 21 of switching transistor 20 and the emitter electrode 25 and collector electrode 26 of photo Darlington transistor 24 in series and the emitter electrode 32 and base electrode 31 of switching transistor 30 and the emitter electrode 35 and collector electrode 36 of photo Darlington transistor in series is connected in series with the collector electrode 42 and emitter electrode 43 of control transistor 40 across battery 8 through lead 53, movable contact 56 and stationary contact 57 of switch 55 when closed and positive polarity lead 58 and through resistor 60 and point of reference or ground potential 5.

To produce a direct current control potential, the series combination of resistor 64, potentiometer 65 having movable contact 66 and resistor 67 is connected across battery 8 through lead 53, movable contact 56 and stationary contact 57 of switch 55 when closed and positive polarity lead 58 and through point of reference or ground potential 5. To provide a substantially constant potential across potentiometer 65 regardless of fluctuations of the potential of battery 8, a potential regulating Zener diode 68 may be connected across potentiometer 65 through a temperature compensating diode 69.

So that selectively variable magnitudes of the control potential appearing across potentiometer 65 may be applied across the control electrode and a selected one of the current carrying electrodes of control transistor 40, base electrode 41 of control transistor 40 is connected to movable contact 66 of potentiometer 65.

To produce a regulating potential of a magnitude proportional to the speed of motor 9, the terminal end of each one of motor armature coils 9a, 9b and 9c is connected through a respective diode 17, 27 and 37 to junction 70 between potentiometer 65 and resistor 67. This circuit will be explained in detail later in this specification.

Upon the closure of movable contact 56 of switch 55 to stationary contact 57, lamp 50 is energized and illuminates at least one of the photo Darlington transistors 14, 24 or 34, depending upon the relative position of clear sections 52a and 52b of shutter 52. For purposes of this specification, it will be assumed that at least photo Darlington transistor 14 is illuminated by lamp 50, consequently, this device conducts through the emitter-collector electrodes to complete a base drive circuit for switching transistor 10 which may be traced from the positive polarity terminal of battery 8 through lead 53, movable contact 56 and stationary contact 57 of switch 55, positive polarity lead 58, the emitter-base electrodes of transistor 10, current limiting resistor 18, the emitter-collector electrodes of photo Darlington transistor 14, lead 74, the collector-emitter electrodes of control transistor 40, resistor 60 and point of reference or ground potential 5 to the negative polarity terminal of battery 8. The resulting emitter-base current flow through switching transistor 10 triggers this device conductive through the emitter-collector electrodes thereof to complete an energizing circuit for motor armature coil 9a. The resulting low of energizing current through motor armature coil 9a produces a magnet field which, interacting with the permanent magnet field, supplies a torque which initiates rotation of rotor 45.

Rotor 45 rotates shutter 52 therewith until the next photo Darlington transistor 24 is illuminated by lamp 50. Consequently, photo Darlington transistor 24 conducts through the emitter-collector electrodes to complete a base drive circuit for switching transistor 20 which may be traced from the positive polarity terminal of battery 8, through lead 53, movable contact 56 and stationary contact 57 of switch 55, positive polarity lead 58, the emitter-base electrodes of switching transistor 20, current limiting resistor 28, the emitter-collector electrodes of photo Darlington transistor 24, lead 74, the collector-emitter electrodes of control transistor 40, resistor 60 and point of reference or ground potential 5 to the negative polarity terminal of battery 8. The resulting emitter-base current flow through switching transistor 20 triggers this device conductive through the emitter-collector electrodes to complete an energizing circuit for motor armature coil 9b. The resulting flow of energization current through motor armature coil 9b produces a magnetic field which, interacting with the permanent magnet field, supplies a torque which maintains the rotation of rotor 45. As rotor 45 rotates shutter member 52, photo Darlington transistor 14 becomes shaded and photo Darlington transistor 34 becomes illuminated by lamp 50. Shaded photo Darlington transistor 14 extinguishes to interrupt the base drive circuit for switching transistor 10, consequently, switching transistor 10 also extinguishes to interrupt the energizing circuit for motor armature coil 9a. Illuminated photo Darlington transistor 34 conducts through the emitter-collector electrodes to complete a base drive circuit for switching transistor 30 which may be traced from the positive polarity terminal of battery 8, through lead 53, movable contact 56 and stationary contact 57 of switch 55, positive polarity lead 58, the emitter-base electrodes of switching transistor 30, current limiting resistor 38, the emitter-collector electrodes of photo Darlington transistor 34, lead 74, the collector-emitter electrodes of control transistor 40, resistor 60 and point of reference or ground potential 5 to the negative polarity terminal of battery 8. The resulting emitter-base current flow through switching transistor 30 triggers this device conductive through the emitter-collector electrodes thereof to complete an energizing circuit for motor armature coil 9c. The resulting flow of energizing current through motor field coil 9c produces a magnetic field which, interacting with the permanent magnet field, supplies the torque which maintains the rotation of rotor 45 until photo Darlington transistor 24 is shaded and photo Darlington transistor 14 is illuminated. Shaded photo Darlington transistor 24 extinguishes to interrupt the base drive circuit for switching transistor 20 to extinguish this device which interrupts the energizing circuit for motor armature coil 9b. Illuminated photo Darlington transistor 14 conducts through the emitter-collector electrodes to complete the base drive circuit, previously described, for switching transistor 10 to trigger this device conductive through the emitter-collector electrodes thereof to complete the energizing circuit for motor armature coil 9a.

This action continues so long as movable contact 56 of switch 55 is closed to stationary contact 57.

As the control potential produced across potentiometer 65 is applied across the base-emitter electrodes of control transistor 40 through movable contact 66 of potentiometer 65, the degree of conduction through transistor 40 is determined by the setting of movable contact 66. As the degree of conduction through control transistor 40 determines the degree of emitter-collector conduction through switching transistors 10, 20 and 30, and the speed of rotation of rotor 45 is determined by the degree of energization of its armature coils through the switching transistors, the speed of motor 9 may be adjusted by adjusting movable contact 66 of potentiometer 65.

The magnetic flux produced by rotating permanent magnet field magnet 45 "cuts" each of motor armature coils 9a, 9b and 9c, consequently, an alternating current potential is induced in each of the armature coils as the north and south poles of the permanent magnet field magnet passes thereunder. This induced alternating current potential in each of motor armature coils 9a, 9b and 9c is of a magnitude proportional to motor speed and is rectified by respective diodes 17, 27 and 37. This rectified induced potential produces a flow of current through resistor 67 which may be traced from the end of the motor armature coils connected to point of reference or ground potential 5, through point of reference or ground potential 5, through resistor 67, lead 75, temperature compensating diode 76, diode 17, 27 or 37, depending upon which of motor armature coils 9a, 9b or 9c is of a negative polarity at the terminal end with respect to point of reference or ground potential 5. This flow of current produces a potential drop across resistor 67 of a positive polarity upon junction 71 with respect to junction 70 which is employed as the regulating potential. As this regulating potential is applied to the control potential appearing across potentiometer 65 in an opposite polarity relationship, this regulating potential reduces the control potential by a magnitude equal to the regulating potential. Should motor 9 increase in speed, the regulating potential across resistor 67 would increase in magnitude to decrease the magnitude of control potential across potentiometer 65. The reduced potential across potentiometer 65 results in a reduced potential across the base-emitter electrodes of control transistor 40 to reduce the degree of collector-emitter current flow therethrough. A reduced collector-emitter current flow through control transistor 40 results in a reduced emitter-base and, consequently, emitter-collector flow through conducting switching transistors 10, 20 or 30, a condition which tends to reduce the speed of motor 9. With a reduction of motor speed, the regulating potential across resistor 67 reduces in magnitude, a condition which tends to increase motor speed.

While specific electrical devices, transistor types and electrical polarities have been set forth in this specification, it is to be specifically understood that alternate electrical devices having similar electrical characteristics, alternate transistor types and compatible electrical polarities may be employed without departing from the spirit of the invention.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. A control circuit for adjusting and regulating the speed of a brushless direct current motor having three "wye" connected armature coils, a permanent magnet field and a rotatable shaft comprising a combination with a source of direct current supply potential, first, second and third switching transistors and a control transistor each having a control electrode and two current carrying electrodes, means for connecting said current carrying electrodes of each one of said switching transistors in series with a respective one of said motor armature coils across said source of direct current supply potential for establishing and interrupting an energizing circuit for each respective motor armature coil, first, second and third photosensitive electrical switching devices, means for connecting said control electrode and a selected one of said current carrying electrodes of each one of said switching transistors, a respective one of said photoelectrical switching devices and said current carrying electrodes of said control transistor across said source of direct current supply potential, means for producing a direct current control potential, means for applying selectively variable magnitudes of said control potential across said control electrode and a selected one of said current carrying electrodes of said control transistor for selectively varying the speed of said motor, means for sequentially illuminating and shading said photosensitive electrical switching devices as said rotatable shaft rotates for sequentially establishing and interrupting said energizing circuits of said motor armature coils, means for producing a regulating potential of a magnitude proportional to the speed of said motor, and means for applying said regulating potential to said control potential in an opposite polarity relationship.

2. A speed control circuit for adjusting and regulating the speed of a brushless direct current motor having three "wye" connected armature coils, a permanent magnet field and a rotatable shaft comprising in combination with a source of direct current supply potential, first, second and third switching transistors and a control transistor each having base, emitter and collector electrodes, means for connecting said collector-emitter electrodes of each one of said switching transistors in series with a respective one of said motor armature coils across said source of direct current supply potential for establishing and interrupting an energizing circuit for each respective motor armature coil, first, second and third photosensitive electrical switching devices, means for connecting said emitter-base electrodes of each one of said switching transistors, a respective one of said photoelectrical switching devices and said collector-emitter electrodes of said control transistor across said source of direct current supply potential, means for producing a direct current control potential, means for applying selectively variable magnitudes of said control potential across said base-emitter electrodes of said control transistor, means for sequentially illuminating and shading said photosensitive electrical switching devices as said rotatable shaft rotates for sequentially establishing and interrupting said energizing circuits of said motor armature coils, means for producing a regulating potential of a magnitude proportional to the speed of said motor, and means for applying said regulating potential to said control potential in an opposite polarity relationship.

3. A speed control circuit for adjusting and regulating the speed of a brushless direct current motor having three "wye" connected armature coils, a permanent magnet field and a rotatable shaft comprising in combination with a source of direct current supply potential, first, second and third switching transistors and a control transistor each having a control electrode and two current carrying electrodes, means for connecting said current carrying electrodes of each one of said switching transistors in series with a respective one of said motor armature coils across said source of direct current supply potential, first, second and third photosensitive electrical switching devices, means for connecting said control electrode and a selected one of said current carrying electrodes of each one of said switching transistors, a respective one of said photoelectrical switching devices and said current carrying electrodes of said control transistor across said source of direct current supply potential, means for sequentially illuminating said photosensitive electrical switching devices as said rotatable shaft rotates, a potentiometer having a movable contact, a resistor, a Zener diode, means for connecting said potentiometer and said resistor in series across said source of direct current supply potential, means for connecting said control electrode of said control transistor to said movable contact of said potentiometer, means for connecting said Zener diode in shunt across said potentiometer, first, second and third diodes, and means for connecting the terminal end of each one of said motor armature coils through a respective one of said first, second and third diodes to the junction between said potentiometer and said resistor.

4. A speed control circuit for adjusting and regulating the speed of a brushless direct current motor having three "wye" connected armature coils, a permanent magnet field and a rotatable shaft comprising in combination with a source of direct current supply potential, first, second and third switching transistors and a control transistor each having base, emitter and collector electrodes, means for connecting said collector-emitter electrodes of each one of said switching transistors in series with a respective one of said motor armature coils across said source of direct current supply potential, first, second and third photosensitive electrical switching devices, means for connecting said emitter-base electrodes of each one of said switching transistors, a respective one of said photoelectrical switching devices and said collector-emitter electrodes of said control transistor across said source of direct current supply potential, means for sequentially illuminating said photosensitive electrical switching devices as said rotatable shaft rotates, a potentiometer having a movable contact, a resistor, a Zener diode, means for connecting said potentiometer and said resistor in series across said source of direct current supply potential, means for connecting said base electrode of said control transistor to said movable contact of said potentiometer, means for connecting said Zener diode in shunt across said potentiometer, first, second and third diodes, and means for connecting the terminal end of each one of said motor armature coils through a respective one of said first, second and third diodes to the junction between said potentiometer and said resistor.

* * * * *